Dec. 3, 1957　　　A. L. COOK　　　2,815,229

SPLINE ADAPTER

Filed March 29, 1955

Inventor
Aaron L. Cook
By Donald C. McLaughry
Attorney

United States Patent Office 2,815,229
Patented Dec. 3, 1957

2,815,229

SPLINE ADAPTER

Aaron L. Cook, Gadsden, Ala., assignor to Allis-Chalmers Manufacturing Company, Milwaukee, Wis.

Application March 29, 1955, Serial No. 497,635

4 Claims. (Cl. 287—52.05)

This invention relates to shaft couplings, and it is concerned particularly with a spline adapter, that is, with a device for connecting an externally splined shaft and an internally splined sleeve which is too large to fit the shaft directly in the ordinary manner.

Various types of spline adapters have heretofore been suggested, particularly for use in connecting farm machinery to the conventional power take-off shaft of a farm tractor. Present trends toward standardization have resulted in two generally preferred sizes of the power take-off shaft, and in two corresponding sizes of coupling sleeves. The smaller size power take-off shaft has a maximum external spline diameter of 1.373 inches, and the larger size coupling sleeve has a minimum internal spline diameter of 1.487 inches. Due to the relatively small difference in diameters between the smaller size power take-off shaft and the larger size coupling sleeve which for the just mentioned dimensions is less than one eighth of an inch, considerable difficulties have been encountered in providing an adequately strong and simple spline adapter which will enable a farmer to quickly and conveniently couple the larger size sleeve to the smaller size power take-off shaft.

In addition to the heavy shear loads to which power take-off couplings are subjected in tractor implement combinations, such couplings are also usually subjected to stress in an axial direction and it is desirable that the adapter be so constructed that it will resist such axial displacement.

Another requirement for proper operation is that the driving and driven shafts be aligned or centered axially relative to each other and it is desirable that the adapter afford automatic centering alignment without increasing the effective axial length of the power take-off shaft.

Generally, it is an object of this invention to provide an improved spline adapter which will take care of the hereinbefore outlined requirements in a practical and fully satisfactory manner.

More specifically, it is an object of this invention to provide an improved spline adapter wherein radial contraction of the coupling sleeve will secure the shaft and sleeve in centered relation to each other.

Another object of this invention is to provide a spline adapter of the hereinabove outlined character which will secure the assembled shaft and sleeve against relative axial displacement.

Another object of this invention is to provide an improved spline adapter which affords maximum shear resistance for taking up torsional loads.

A further object of this invention is to provide an improved spline adapter of the hereinabove outlined character which is simple and compact in construction, efficient in operation, and which may be manufactured at a minimum of cost.

The foregoing and other objects and advantages are attained by the present invention, various novel features of which will become apparent from the description herein of a preferred embodiment of the invention, and will be set forth in the appended claims.

Referring to the drawings.

Figures 1, 2:
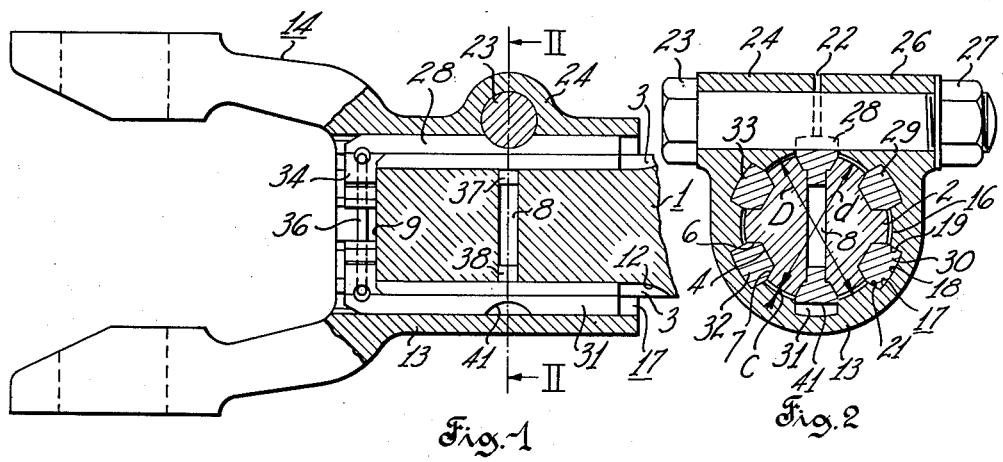
Fig. 1 is an elevational view of a shaft and sleeve assembly including a spline adapter, with parts broken away and shown in section.
Fig. 2 is a sectional view taken along line II—II of Fig. 1.
Figure 3:
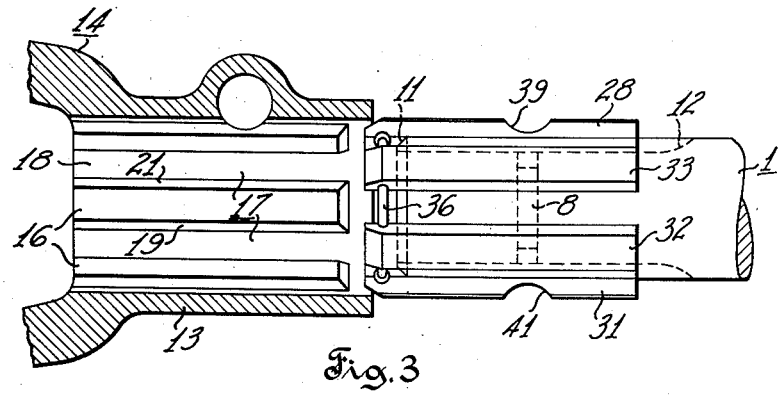
Fig. 3 is an elevational view illustrating part of a coupling sleeve shown in Fig. 1 and a spline shaft and associated adapter keys in a preparatory condition for connection with the coupling sleeve.
Figure 4:
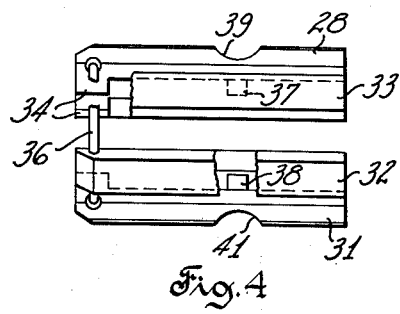
Fig. 4 is a detail view of a key bunch forming part of the assembly shown in Fig. 1, some of the parts shown in Fig. 4 having portions thereof broken away for purposes of exposure.
Figure 5:
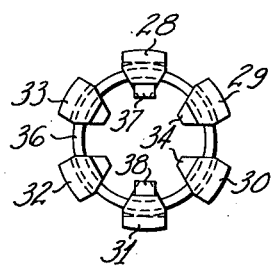
Fig. 5 is an end view of the key bunch shown in Fig. 4.

Referring to Figs. 1, 2 and 3, the rear end of a conventional tractor power take-off shaft is generally indicated by the reference character 1, and has a circumferential series of six longitudinally extending splines 2 which are of standard dimensions and formed in conformity with conventional, well known practices. The splines 2 are separated circumferentially from each other by six peripherally spaced, radially outward facing recesses or spline ways 3, each having a longitudinally extending bottom surface 4, and a pair of radially inward converging, longitudinally extending side surfaces 6 and 7. A cylindrical bore 8 extends between the bottom surfaces 4 of one pair of diametrically opposed spline ways 3, the bore 8 being spaced from the radial end face 9 of the power take-off shaft 1 an axial distance which is approximately half the total axial length of the splines 2. As customary, the rear ends of the splines are chamfered, as indicated at 11, and the front ends of the spline ways are flared outwardly, as indicated at 12.

The external or maximum diameter of the splined portion of the power take-off shaft is indicated by the double headed arrow $d$ in Fig. 2, and the standardized dimension for this diameter of the small size power take-off shaft is 1.373 inches maximum. The larger size standardized power take-off shaft, not shown, has a maximum external spline diameter of 1.747 inches.

As shown in Figs. 1 and 2, the splined end of the power take-off shaft 1 is surrounded in radially spaced relation thereto by the hub sleeve 13 of a universal coupling fork 14. The fork 14 is suitably constructed for cooperation with complementary parts, not shown, of a conventional universal coupling, and the hub sleeve 13 has a circumferential series of six longitudinally extending splines 16 which are of standard dimensions and formed in conformity with conventional well known practices. The splines 16 are separated circumferentially from each other by six peripherally spaced radially inward facing recesses or spline ways 17 each having a longitudinally extending bottom surface 18 and parallel longitudinally extending side surfaces 19 and 21. The hub sleeve 13 is split by a gap 22 which extends through the circumferential wall of the hub sleeve from one end of the latter to the other so as to provide for resilient radial expansion and contraction of the sleeve 13. A bolt 23 extends through apertured lugs 24 and 26 and, together with a nut 27 provides clamping means for contracting the sleeve 13 and thereby securing it to the power take-off shaft 1, as will be explained more fully hereinbelow.

The double headed arrow $d$ in Fig. 2 indicates the internal or minimum diameter of the splined coupling sleeve 13, and the standardized dimension for this diameter of the large size coupling sleeve is 1.487 inches. The smaller size standardized coupling sleeve, not shown, has a minimum inside diameter of 1.168 inches so as to fit the splines of the standard small diameter standard power take-off shaft.

In the condition of the parts as shown in Figs. 1 and 2, the radially outward facing recesses 3 of the power take-off shaft 1, are in radical registering relation, respectively, with the radially inward facing recesses 17 of the hub sleeve 13, and an annular series of key members 28 to 33, inclusive, are operatively interposed between registering pairs of the shaft and sleeve recesses 3 and 17 in radial and circumferential load transmitting relation to the shaft 1 and sleeve 13 so as to connect the sleeve and shaft in centered and rotatably locked condition with each other. The keys 28 to 33 are of generally similar construction in that each has a tapered body portion which fits into any one of the shaft recesses 3, and a generally rectangular top portion which fits into any one of the sleeve recesses 17. Moreover, each of the keys 28 to 33, inclusive, has a radially inward extending end lug 34 in axial thrust transmitting engagement with the end face 9 of the power take-off shaft 1. A tie element in the form of a wire ring 36 extends through holes in the end lugs 34 so as to connect the key members 28 to 33 loosely, in key bunch fashion, with each other independently of the shaft 1 and sleeve 13. The keys 29, 30, 32 and 33 are exact duplicates of each other, but the keys 28 and 31 differ slightly from the keys 29, 30, 32, 33 in that the key 28 has a short cylindrical stud or stop element 37 which extends radically inward into the shaft bore 8 from one end of the latter, and in that the key 31 has a similar cylindrical stud or stop element 38 which extends into the shaft bore 8 from the other end of the latter. The purpose of the studs 37 and 38 is to secure the keys 28 and 31 against axial back and forth displacement relative to the power take-off shaft 1. Referring to Figs. 1 and 2 it will be noted that the shank of the bolt 23 intersects the key 28 and the latter is provided with a cylindrical notch 39 (Fig. 3) to accommodate the shank of the bolt 23. The key 31 has a similar notch 41, the purpose being to provide for proper engagement of the bolt 23 with either the key 28 or with the key 31 so as to secure one or the other of these keys against axial displacement relative to the sleeve 13.

In the assembled condition of the parts as shown in Figs. 1 and 2, the nut 27 is drawn up on the bolt 23 so as to securely clamp the sleeve 13 into engagement with the keys 28 to 33, inclusive, and so as to seat the latter firmly in the shaft recesses 3. In this condition of the parts the external surfaces of the shaft splines 2 are separated from the internal surfaces of the sleeve splines 17 by a small radial gap indicated at c in Fig. 2 and which, for the hereinabove mentioned dimensions, is less than one sixteenth of an inch. The keys 28 to 33 are finished with the necessary degree of accuracy so that in the assembled condition of the parts the hub sleeve 13 will be accurately centered with respect to the power take-off shaft 1.

In order to separate the coupling sleeve 13 from the power take-off shaft 1, the nut 27 is unscrewed from the bolt 23 and the latter is withdrawn from the sleeve lugs 24 and 26. The sleeve 13 may then be withdrawn by axial movement relative to the shaft 1 and keys 28 to 33 as indicated in Fig. 3. Upon complete separation of the sleeve 13 from the keys the latter may be lifted radially out of the shaft recesses 3, the studs 37, 38 being of proper size so that they will readily separate from the shaft bore 8. Upon removal of the keys from the power take-off shaft they will be loosely held together by the wire ring 36. The bunch of keys may conveniently be be stored away without liability of one of the keys becoming lost.

In order to attach the sleeve 13 to the power take-off shaft the bunch of keys is placed around the power take-off shaft 1 as shown in Fig. 3 and temporarily held by hand on the shaft while the sleeve 13 is moved axially over the shaft a sufficient distance which will make the keys self-supporting. During this initial and the subsequent further axial movement of the sleeve 13 over the shaft 1, the end lugs 34 of the keys prevent axial forward movement of the keys on the shaft 1. Consequently, there is no danger that the keys may slide forwardly upon the flared portions 12 of the spline recesses 3 which would prevent proper movement of the sleeve 13 into the axially adjusted position relative to the key 28, in which it is shown in Fig. 1. In that position the bolt holes in the lugs 24, 26 register with the recess 39 of the key 28 so that axial thrust transmitting means in the form of a bolt 23 may be installed as shown in Fig. 2. In the installed position of the bolt 23 its shank interlocks with the key 28, and since the latter is interlocked with the shaft 1 by the stud 37, the sleeve 13 will be positively secured against axial back and forth displacement relative to the shaft 1, when the bolt is inserted into the lugs 24 and 26. Tightening of the nut 27 on the bolt 23 contracts the sleeve into firm radial engagement with the keys 28 to 33, and it also wedges the keys radially into their corresponding shaft recesses. As a result, the sleeve 13 will not only be secured against axial displacement relative to the shaft 1, but all circumferential play of the sleeve and shaft relative to each other will be taken up, so that there will be no possibility of backlash between the shaft 1 and fork 14. On the other hand, when the nut 27 is removed from the bolt 23 the sleeve 13 will expand slightly due to inherent resiliency, and after removal of the bolt 23 from the sleeve 13, axial withdrawal of the latter from the keys 28 to 33 will not be unduly impeded by friction.

It is to be understood that it is not desired to limit the invention to the particular features and details described hereinabove, and that the invention is to be considered as including such other forms and modifications as are fairly embraced by the scope of the appended claims.

It is claimed and desired to secure by Letters Patent:

1. A shaft and sleeve assembly comprising, in combination, a shaft element presenting peripherally spaced, radially outward facing recesses, a sleeve element having an internal diameter greater than the diameter of said shaft element and positioned in surrounding relation to the latter, said sleeve element having an internal peripheral surface positioned in radially spaced relation to said shaft element and presenting peripherally spaced radially inward facing recesses in radially registering relation, respectively, with said shaft recesses, and key members operatively interposed between registering pairs of said shaft and sleeve recesses in radial and circumferential load transmitting relation to said spaced shaft and sleeve elements so as to connect said sleeve and shaft elements in centered and rotatively locked condition with each other.

2. A shaft and sleeve assembly comprising, in combination, an externally splined shaft element presenting peripherally spaced, axially elongated recesses between its splines; a split, radially contractible internally splined sleeve element having an internal diameter greater than said shaft element and positioned in surrounding radially spaced relation thereto and presenting peripherally spaced axially elongated recesses between its splines in radially registering relation, respectively, with said shaft recesses; key members operatively interposed between registering pairs of said shaft and sleeve recesses in radial and circumferential load transmitting relation to said shaft and sleeve elements; and releasable clamping means operatively associated with said sleeve element radially contracting the latter to apply a radial clamping force on said key members thereby securing said shaft and sleeve elements in centered torque transmitting relation to each other.

3. A shaft and sleeve assembly comprising, in combination, an externally splined shaft element presenting peripherally spaced, axially elongated recesses between its splines; an internally splined sleeve element having an internal diameter greater than the diameter of said shaft element and positioned in surrounding relation to the latter, said sleeve element having an internal peripheral surface positioned in radially spaced relation to said shaft element and presenting peripherally spaced, axially elongated recesses between its splines in radially registering relation, respectively, with said shaft recesses; key members operatively interposed between registering pairs of said shaft and sleeve recesses in radial and circumferential load transmitting relation to said spaced shaft and sleeve elements; stop elements operatively associated, respectively, with one of said key members and with said shaft element in radially separable, axial thrust transmitting relation to each other so as to releasably secure said one key member against axial back and forth displacement relative to said shaft element; and separable, axial thrust transmitting connecting means operatively interposed between said one key member and said sleeve element for securing said one key member against axial back and forth displacement relative to said sleeve element.

4. A shaft and sleeve assembly comprising, in combination, an externally splined shaft element presenting peripherally spaced, axially elongated recesses between its splines, a split, radially contractible and internally splined sleeve element having an internal diameter greater than the diameter of said shaft element and positioned in surrounding relation to the latter, said sleeve element having an internal peripheral surface positioned in radially spaced relation to said shaft element and presenting peripherally spaced axially elongated recesses between its splines in radially spaced registering relation, respectively, with said shaft recesses; key members operatively interposed between registering pairs of said shaft and sleeve recesses in radial and circumferential load transmitting relation to said spaced shaft and sleeve elements; releasable clamping means including a bolt element mounted on said sleeve element in radially offset relation to said shaft element for contracting said sleeve element, said bolt element extending radially into a recess formed on one of said key members so as to secure said one key member against longitudinal back and forth displacement relative to said sleeve element; and stop elements operatively associated, respectively, with said one key member and with said shaft element in radially separable, axial thrust transmitting relation to each other so as to releasably secure said one key member against axial back and forth displacement relative to said shaft element.

References Cited in the file of this patent

UNITED STATES PATENTS

| 164,609 | Thomas | June 15, 1875 |
| 392,369 | Schindler et al. | Nov. 6, 1888 |
| 1,491,865 | Kelly | Apr. 29, 1924 |
| 1,604,423 | Rosewood | Oct. 26, 1926 |